(12) United States Patent
Takasawa

(10) Patent No.: US 11,774,913 B2
(45) Date of Patent: *Oct. 3, 2023

(54) WATCH COMPONENT AND WATCH

(71) Applicant: Seiko Epson Corporation, Tokyo (JP)

(72) Inventor: Koki Takasawa, Suwa (JP)

(73) Assignee: SEIKO EPSON CORPORATION

( * ) Notice: Subject to any disclaimer, the term of this patent is extended or adjusted under 35 U.S.C. 154(b) by 23 days.

This patent is subject to a terminal disclaimer.

(21) Appl. No.: 17/093,791

(22) Filed: Nov. 10, 2020

(65) Prior Publication Data

US 2021/0141343 A1  May 13, 2021

(30) Foreign Application Priority Data

Nov. 11, 2019  (JP) ................. 2019-203675

(51) Int. Cl.
| | |
|---|---|
| C22C 38/00 | (2006.01) |
| G04B 37/22 | (2006.01) |
| G04B 19/12 | (2006.01) |
| C22C 38/44 | (2006.01) |
| C22C 38/48 | (2006.01) |
| C22C 38/42 | (2006.01) |
| C22C 38/02 | (2006.01) |
| C22C 38/04 | (2006.01) |

(52) U.S. Cl.
CPC ............ *G04B 37/22* (2013.01); *C22C 38/001* (2013.01); *C22C 38/002* (2013.01); *C22C 38/02* (2013.01); *C22C 38/04* (2013.01); *C22C 38/42* (2013.01); *C22C 38/44* (2013.01); *C22C 38/48* (2013.01); *G04B 19/12* (2013.01); *C21D 2211/001* (2013.01); *C21D 2211/005* (2013.01)

(58) Field of Classification Search
None
See application file for complete search history.

(56) References Cited

U.S. PATENT DOCUMENTS

| | | | |
|---|---|---|---|
| 7,875,128 B2 * | 1/2011 | Kuroda | ................... C22C 38/20 420/34 |
| 8,303,168 B2 | 11/2012 | Takasawa | |
| 2006/0130938 A1 | 6/2006 | Kramer | |
| 2007/0217293 A1 | 9/2007 | Takasawa | |
| 2014/0219856 A1 | 8/2014 | Oliver et al. | |
| 2017/0088912 A1 | 3/2017 | Fukuda et al. | |

FOREIGN PATENT DOCUMENTS

| | | |
|---|---|---|
| JP | 2000-155182 A | 6/2000 |
| JP | 2005-097682 A | 4/2005 |
| JP | 2007-056301 A | 3/2007 |

(Continued)

*Primary Examiner* — Humera N. Sheikh
*Assistant Examiner* — Kim S. Horger
(74) *Attorney, Agent, or Firm* — Harness, Dickey & Pierce, P.L.C.

(57) ABSTRACT

A watch component includes an austenized ferritic stainless steel, the austenized ferritic stainless steel including a first layer including a ferrite phase, and a second layer including an austenized phase formed of a nitrogen solid solution of the ferrite phase. An average particle size of ferrite crystal grains constituting the ferrite phase is 300 μm or greater, and an average particle size of austenitic crystal grains constituting the austenized phase is 150 μm or smaller.

14 Claims, 6 Drawing Sheets

(56) References Cited

FOREIGN PATENT DOCUMENTS

| | | |
|---|---|---|
| JP | 2007-239060 A | 9/2007 |
| JP | 2007-248397 A | 9/2007 |
| JP | 2009-069049 A | 4/2009 |
| JP | 2013-101157 A | 5/2013 |
| JP | 2014-526613 A | 10/2014 |
| JP | 2018-131643 A | 8/2018 |
| WO | 2021-100687 A1 | 5/2021 |

\* cited by examiner

WATCH COMPONENT AND WATCH

The present application is based on, and claims priority from JP Application Serial Number 2019-203675, filed Nov. 11, 2019, the disclosure of which is hereby incorporated by reference herein in its entirety.

BACKGROUND

1. Technical Field

The present disclosure relates to a watch component and a watch.

2. Related Art

JP-A-2000-155182 discloses a watch in which an amorphous material having a layered structure has a magnetic resistance structure. In JP-A-2000-155182, a sufficient magnetic resistance is achieved by disposing a magnetic resistance structure in which an amorphous material is layered in a space inside a watch.

However, when a sufficient space cannot be ensured inside a watch in JP-A-2000-155182, the number of layers of the amorphous material cannot be increased, and a predetermined magnetic resistance cannot be ensured.

In addition, it is conceivable to ensure a predetermined magnetic resistance by providing a case back of a ferritic stainless steel material as described in the background of JP-A-2000-155182; however, in this case, the specularity is poor and the design quality is degraded.

SUMMARY

A watch component of the present disclosure includes an austenized ferritic stainless steel, the austenized ferritic stainless steel including a first layer including a ferrite phase, and a second layer including an austenized phase formed of a nitrogen solid solution of the ferrite phase. An average particle size of ferrite crystal grains constituting the ferrite phase is 300 μm or greater, and an average particle size of austenitic crystal grains constituting the austenized phase is 150 μm or smaller.

A watch of the present disclosure includes the above-described watch component.

DESCRIPTION OF EXEMPLARY EMBODIMENTS

An embodiment of the present disclosure will be described below with reference to the drawings.

Figure 1:
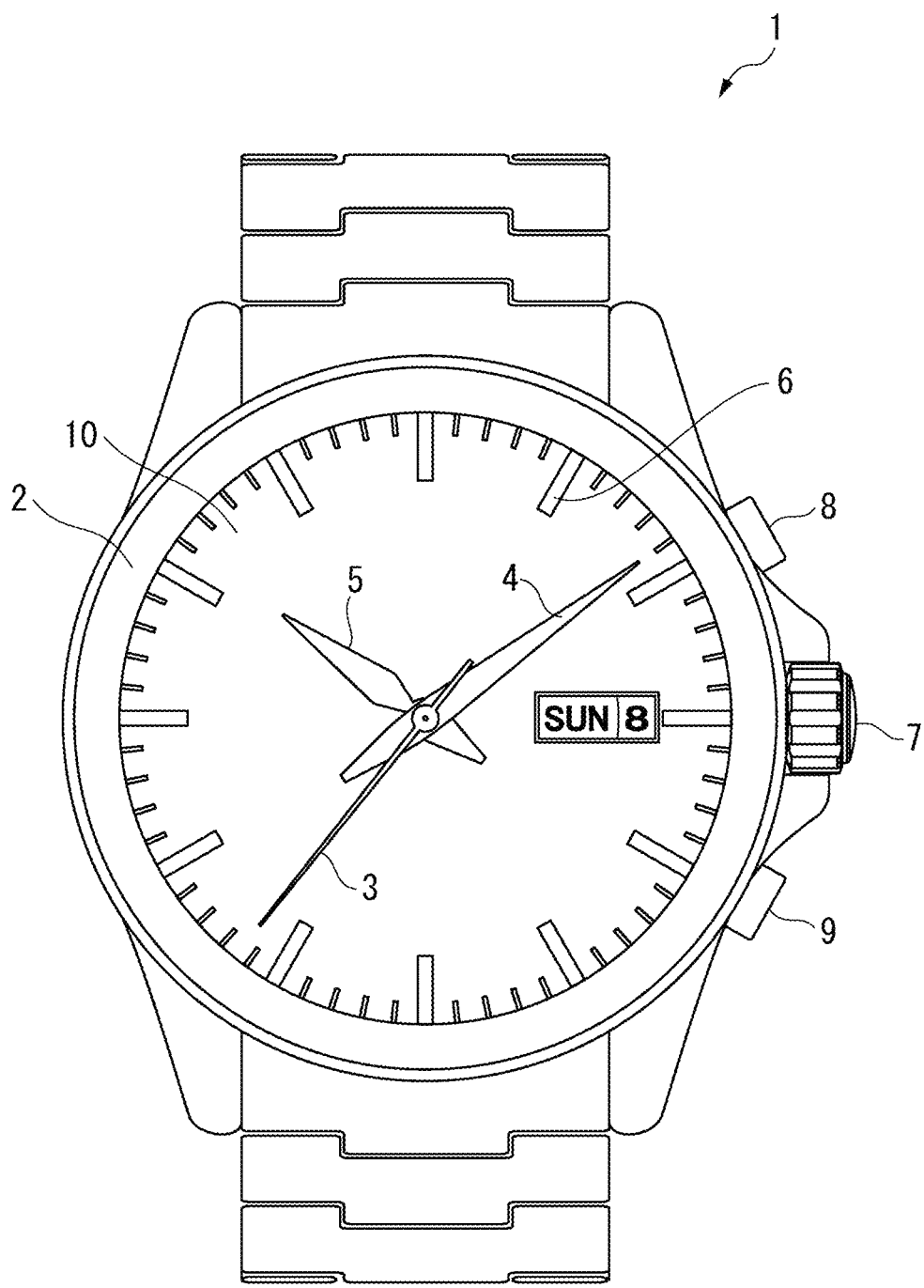
FIG. 1 is a front view illustrating a watch according to an embodiment of the present disclosure.

FIG. 1 is a front view illustrating a watch 1. In this embodiment, the watch 1 is configured as a wristwatch that is worn on the user's wrist.

As illustrated in FIG. 1, the watch 1 includes a metal case 2. In addition, inside the case 2, a disk-shaped dial 10, a second hand 3, a minute hand 4, a hand needle 5, a crown 7, an A-button 8 and a B-button 9 are provided. Note that the case 2 is an example of a watch component of the present disclosure.

The dial 10 is provided with an hour mark 6 for indicating the time of day.

Case

Figure 2:
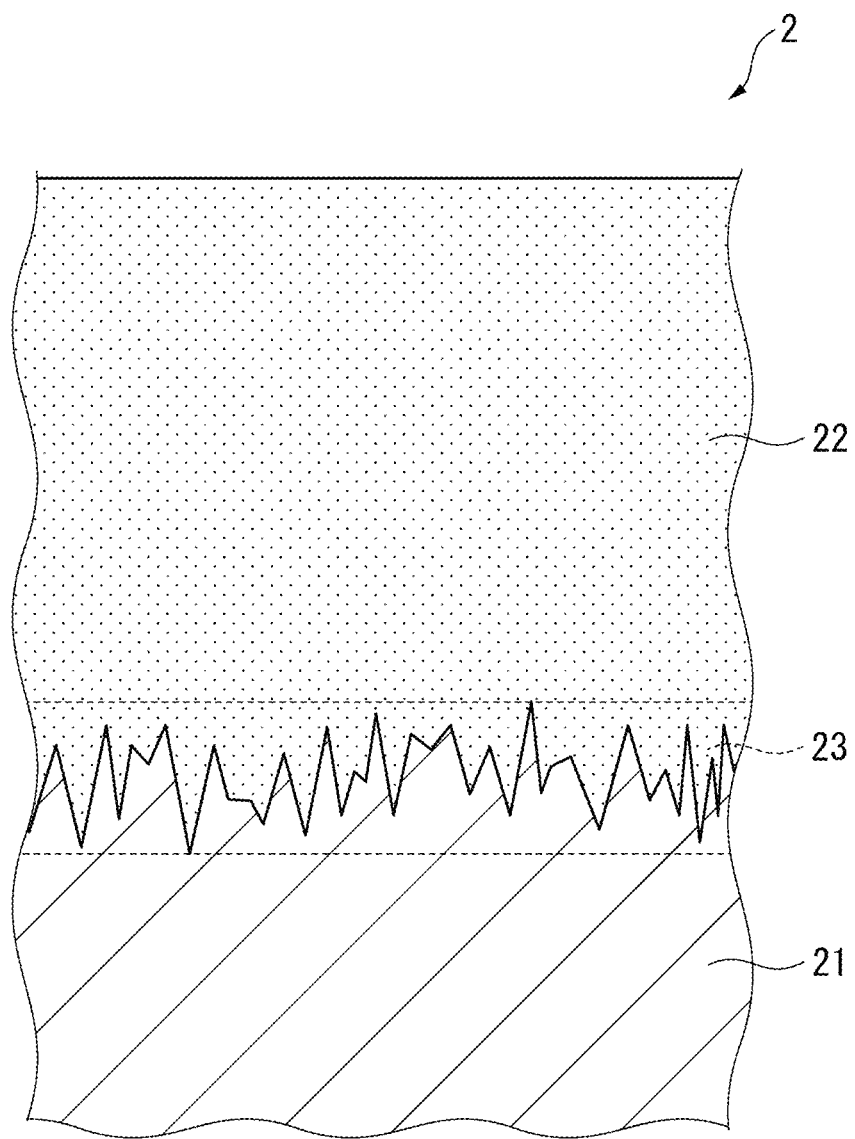
FIG. 2 is a cross-sectional view illustrating a predetermined range from a surface of a case.

FIG. 2 is a cross-sectional view illustrating a predetermined range from the surface of the case 2. Note that FIG. 2 illustrates a cross-sectional view taken along a direction orthogonal to the surface of the case 2 or a direction of a normal to the surface.

As illustrated in FIG. 2, the case 2 includes an austenized ferritic stainless steel including a first layer 21 including a ferrite phase, a second layer 22 including an austenized phase in which a ferrite phase is austenized, and a mixed layer 23 in which a ferrite phase and an austenized phase are mixed.

First Layer

The first layer 21 includes a ferritic stainless steel that contains, by mass %, 18 to 22% Cr, 1.3 to 2.8% Mo, 0.05 to 0.50% Nb, 0.1 to 0.8% Cu, less than 0.5% Ni, less than 0.8% Mn, less than 0.5% Si, less than 0.10% P, less than 0.05% S, less than 0.05% N, and less than 0.05% C, with the remainder composed of Fe and unavoidable impurities.

Cr is an element that increases the transfer rate of nitrogen to the ferrite phase and the diffusion rate of nitrogen in the ferrite phase in the nitrogen absorption treatment. When Cr is less than 18%, the transfer rate and diffusion rate of nitrogen is low. Further, when Cr is less than 18%, the corrosion resistance of the surface layer 22 is reduced. On the other hand, when the Cr is greater than 22%, it is hardened and the workability as the material is degraded. Further, when the Cr is greater than 22%, the aesthetic appearance is impaired. Therefore, the content of Cr is preferably 18 to 22%, more preferably 20 to 22%, even more preferably 19.5 to 20.5%.

Mo is an element that increases the transfer rate of nitrogen to the ferrite phase and the diffusion rate of nitrogen in the ferrite phase in the nitrogen absorption treatment. When Mo is less than 1.3%, the transfer rate and diffusion rate of nitrogen is low. Further, when Mo is less than 1.3%, the corrosion resistance as the material is reduced. On the other hand, when Mo is greater than 2.8%, it is hardened and the workability as the material is degraded. Further, when Mo is greater than 2.8%, the heterogeneity of the compositional structure of the surface layer 22 becomes significant and the aesthetic appearance is impaired. Therefore, the content of Mo is preferably 1.3 to 2.8%, more preferably 1.8 to 2.8%, even more preferably 2.25 to 2.35%.

Nb is an element that increases the transfer rate of nitrogen to the ferrite phase and the diffusion rate of nitrogen in the ferrite phase in the nitrogen absorption treatment. When Nb is less than 0.05%, the transfer rate and diffusion rate of nitrogen is low. On the other hand, when Nb is greater than 0.50%, it is hardened and the workability as the material is degraded. Further, precipitates are formed and the aesthetic appearance is impaired. Therefore, the content of Nb is preferably 0.05 to 0.50%, more preferably 0.05 to 0.35%, even more preferably 0.15 to 0.25%.

Cu is an element that controls the absorption of nitrogen in the ferrite phase in the nitrogen absorption treatment.

When Cu is less than 0.1%, the variation in nitrogen content in the ferrite phase is large. On the other hand, when Cu is greater than 0.8%, the transfer rate of nitrogen to the ferrite phase is low. Therefore, the content of Cu is preferably 0.1 to 0.8%, more preferably 0.1 to 0.2%, even more preferably 0.1 to 0.15%.

Ni is an element that inhibits the transfer of nitrogen to the ferrite phase and the diffusion of nitrogen in the ferrite phase in the nitrogen absorption treatment. When Ni is 0.5% or greater, the transfer rate and diffusion rate of nitrogen are reduced. Further, the corrosion resistance may be degraded, and it may be difficult to prevent the occurrence of metal allergies and the like. Therefore, the content of Ni is preferably less than 0.5%, more preferably less than 0.2%, even more preferably less than 0.1%.

Mn is an element that inhibits the transfer of nitrogen to the ferrite phase and the diffusion of nitrogen in the ferrite phase in the nitrogen absorption treatment. When Mn is 0.8% or greater, the transfer rate and diffusion rate of nitrogen are reduced. Therefore, the content of Mn is preferably less than 0.8%, more preferably less than 0.5%, even more preferably less than 0.1%.

Si is an element that inhibits the transfer of nitrogen to the ferrite phase and the diffusion of nitrogen in the ferrite phase in the nitrogen absorption treatment. When Si is 0.5% or greater, the transfer rate and diffusion rate of nitrogen are reduced. Therefore, the content of Si is preferably less than 0.5%, more preferably less than 0.3%.

P is an element that inhibits the transfer of nitrogen to the ferrite phase and the diffusion of nitrogen in the ferrite phase in the nitrogen absorption treatment. When P is 0.10% or greater, the transfer rate and diffusion rate of nitrogen are reduced. Therefore, the content of P is preferably less than 0.10%, more preferably less than 0.03%.

S is an element that inhibits the transfer of nitrogen to the ferrite phase and the diffusion of nitrogen in the ferrite phase in the nitrogen absorption treatment. When S is 0.05% or greater, the transfer rate and diffusion rate of nitrogen are reduced. Therefore, the content of S is preferably less than 0.05%, more preferably less than 0.01%.

N is an element that inhibits the transfer of nitrogen to the ferrite phase and the diffusion of nitrogen in the ferrite phase in the nitrogen absorption treatment. When N is 0.05% or greater, the transfer rate and diffusion rate of nitrogen are reduced. Therefore, the content of N is preferably less than 0.05%, more preferably less than 0.01%.

C is an element that inhibits the transfer of nitrogen to the ferrite phase and the diffusion of nitrogen in the ferrite phase in the nitrogen absorption treatment. When C is 0.05% or greater, the transfer rate and diffusion rate of nitrogen are reduced. Therefore, the content of C is preferably less than 0.05%, more preferably less than 0.02%.

Second Layer

The second layer 22 is formed by applying the nitrogen absorption treatment to the surface of the first layer 21. Specifically, the second layer 22 includes an austenized phase formed of a nitrogen solid solution.

In the present embodiment, the content of nitrogen in the second layer 22 is 1.0 to 1.6% by mass %.

Mixed Layer

The mixed layer 23 is formed by variation in the transfer rate of nitrogen entering the first layer 21 including the ferrite phase in the process of forming the second layer 22. Specifically, at a portion where the transfer rate of nitrogen is high, nitrogen reaches a deep portion of the first layer 21 and it is austenized, whereas at a portion where the transfer rate of nitrogen is low, it is austenized only at a shallow portion of the first layer 21. Thus, the mixed layer 23 in which the ferrite phase and the austenized phase are mixed with respect to the depth direction is formed.

Crystal Grains of Ferrite Phase and Austenized Phase

Figure 3:
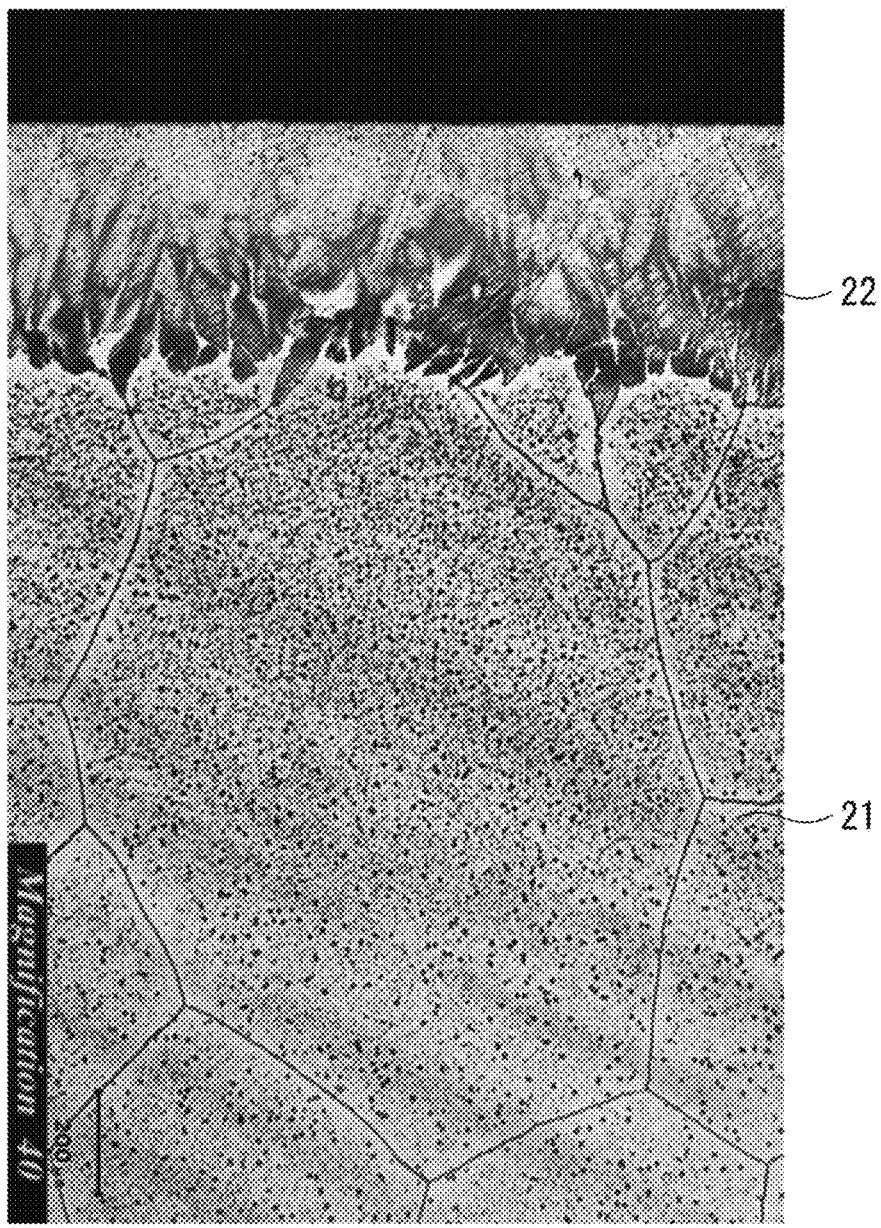
FIG. 3 is a photograph showing a cross-section of a predetermined range from a surface of a case.

FIG. 3 is a photograph showing a cross-section of a predetermined range from the surface of the case 2. Note that FIG. 3 is taken in such a manner that a given portion of the case 2 is cut from the surface along the depth direction, i.e., along a direction orthogonal to the surface, and the cut surface is polished, and thereafter, the ferrite phase is etched using an etching agent.

As illustrated in FIG. 3, ferrite crystal grains constituting the ferrite phase are observed in the first layer 21. In addition, austenitic crystal grains constituting the austenized phase are observed in the second layer 22.

Here, in the present embodiment, the ferrite crystal grains are configured such that the average particle size is 300 μm or greater and 550 μm or smaller. In addition, the austenized crystal grains are configured such that the average particle size is 50 μm or greater and 150 μm or smaller, and the maximum particle size is 100 μm or greater and 400 μm or smaller.

Here, "average particle size" refers to an average value of the particle sizes of the plurality of arbitrarily extracted crystal grains within a field of view in SEM observation of a predetermined cross-section of the case 2 at a magnification of 500 to 1000, for example. In addition, "maximum particle size" refers to the value of the particle size of the largest crystal grain among the plurality of arbitrarily extracted crystal grains within the field of view in the above-mentioned observation.

Evaluation Test

Next, an evaluation test on the relationship between the magnetic resistance and the average particle size of the ferrite crystal grains was conducted.

In addition, an evaluation test on the relationship between the design quality and the average particle size and the maximum particle size of the austenitic crystal grains was conducted.

Overviews and results of the evaluation tests are described below.

Magnetic Resistance Test

First, a plurality of base materials composed of a ferritic stainless steel containing 20% Cr, 2.1% Mo, 0.2% Nb, 0.1% Cu, 0.05% Ni, 0.5% Mn, 0.3% Si, 0.03% P, 0.01% S, 0.01% N, and 0.02% C, with the remainder composed of Fe and unavoidable impurities was produced.

Next, by applying a nitrogen absorption treatment to each base material, an austenized ferritic stainless steel in which an austenized second layer is formed on the surface of a first layer was obtained. At this time, the treatment conditions of the nitrogen absorption treatment for each base material, namely, the heating time, heating temperature, heating frequency, and the like were adjusted to obtain a plurality of austenized ferritic stainless steels whose average particle sizes of the ferrite crystal grains constituting the ferrite phase of the first layer are 30 μm, 50 μm, 80 μm, 100 μm, 200 μm, 300 μm, 400 μm, and 500 μm.

Then, each austenized ferritic stainless steel was processed to produce a watch case having a thickness of 4 mm. A movement for use in general quartz watches was housed in each of the produced watch cases, and the magnetic resistance test specified in "JIS B 7024" was conducted.

Design Quality Test

First, a plurality of base materials composed of a ferritic stainless steel identical to that used in the above-described magnetic resistance test was produced.

Next, by applying a nitrogen absorption treatment to each base material, an austenized ferritic stainless steel in which an austenized second layer is formed on the surface of a first layer was obtained. At this time, the treatment conditions of the nitrogen absorption treatment for each base material, namely, the heating time, heating temperature, heating frequency, and the like were adjusted to obtain a plurality of austenized ferritic stainless steels whose average particle sizes of the austenitic crystal grains constituting the austenized phase of the second layer are 1 μm, 50 μm, 100 μm, 150 μm, 200 μm, and 250 μm. At this time, the maximum particle sizes of the austenitic crystal grains were 2 μm, 100 μm, 250 μm, 400 μm, 500 μm, and 650 μm.

Then, each austenized ferritic stainless steel was processed to produce a watch case, and the watch case was polished, and then, the design quality was visually evaluated.

The design quality was evaluated based on the following criteria.

Criteria

A: Almost no influence of crystal grains was observed on the case surface, and the specularity is very high B: Influence of crystal grains is slightly observed on the case surface, and the specularity was slightly low.

C: Influence of crystal grains is observed in some parts of the case, and the specularity is low.

Results of Evaluation: Magnetic Resistance Test

Figure 4:
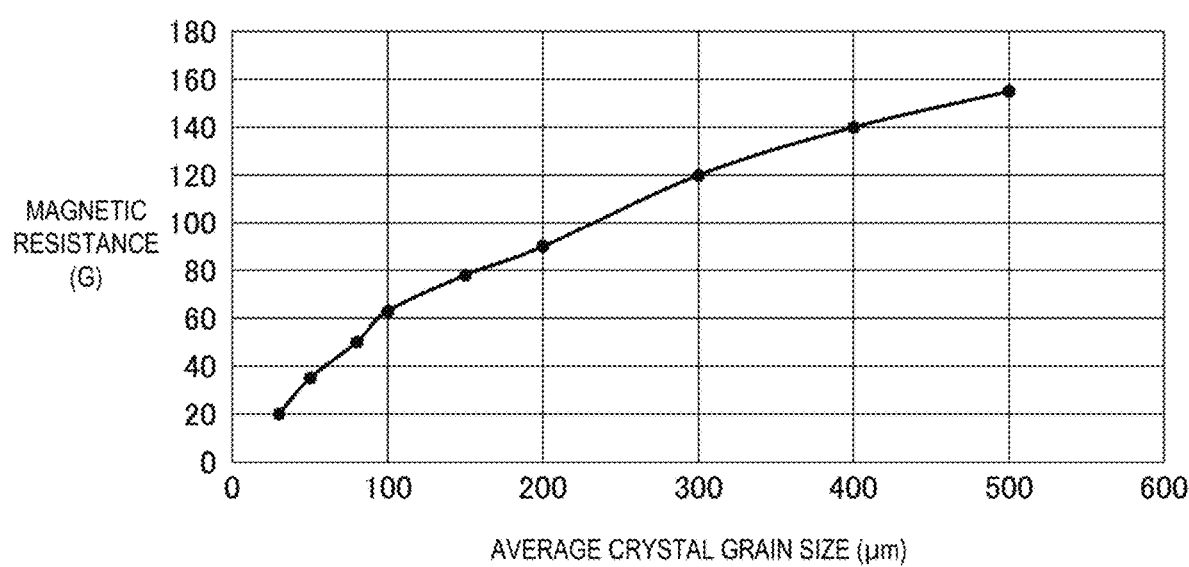
FIG. 4 is a graph illustrating a relationship between a magnetic resistance and an average particle size of a ferrite crystal grains.

FIG. 4 is a graph illustrating a relationship between the magnetic resistance and the average particle size of the ferrite crystal grains of the present test.

As illustrated in FIG. 4, a correlation between the magnetic resistance and the average particle size of the ferrite crystal grains was shown, and it was suggested that the larger the average particle size, the higher the magnetic resistance.

In particular, it was suggested that when the average particle size is greater than 150 μm, the magnetic resistance is approximately 80 G or greater, and thus a magnetic resistance corresponding to the first-class magnetic resistant watch can be ensured. In addition, it was suggested that when the average particle size is greater than 300 μm, the magnetic resistance is 120 G or greater, and thus the magnetic resistance required to guarantee the first-class magnetic resistant watch can be ensured. Further, it was suggested that when the average particle size is greater than 350 μm, the magnetic resistance was 130 G or greater, and thus a sufficient magnetic resistance to guarantee the first-class magnetic resistant watch can be ensured.

This suggests that, to ensure a predetermined magnetic resistance, the average particle size of the ferrite crystal of the ferrite phase constituting the first layer is desirably 300 μm or greater, more desirably 350 μm or greater.

Note that when the average particle size of the ferrite crystal is greater than 550 μm, the mechanical strength required for a watch case may not be obtained. Therefore, in consideration of the strength as a watch case, the average particle size of the ferrite crystal is desirably 550 μm or smaller. In addition, when the average particle size of the ferrite crystal is 500 μm or smaller, a sufficient mechanical strength can be ensured as a watch case.

Specifically, it was suggested that the average particle size of the ferrite crystal of the ferrite phase constituting the first layer is desirably 300 μm or greater and 550 μm or smaller, more desirably 350 μm or greater and 500 μm or smaller.

Results of Evaluation: Design Quality Test

As shown in Table 1, when the austenitic crystal grains have an average particle size of 150 μm or smaller and a maximum particle size of 400 μm or smaller, the determination result of the design quality is "A". When the austenitic crystal grains have an average particle size of 200 μm and a maximum particle size of 550 μm, the determination result is "B", and when the austenitic crystal grains have an average particle size of 250 μm and a maximum particle size of 650 μm, the determination result is "C".

Figure 5:
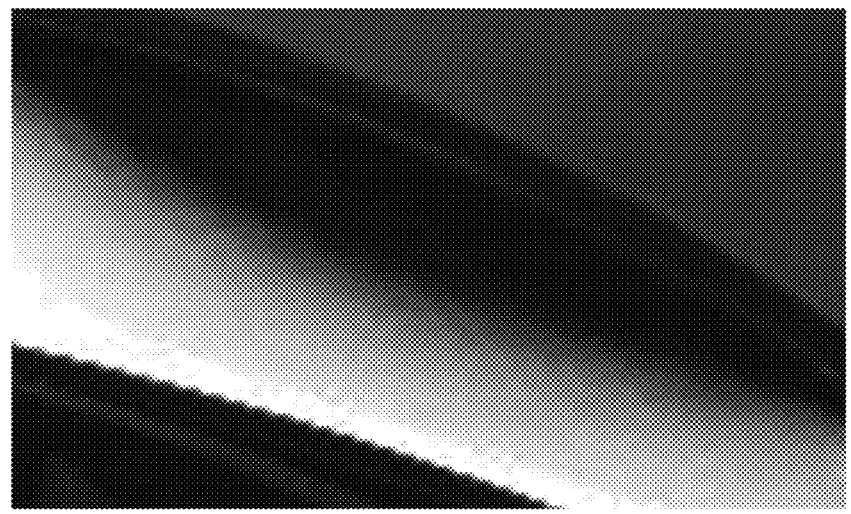
FIG. 5 is a photograph showing a surface of a case of an evaluation test.
Figure 6:
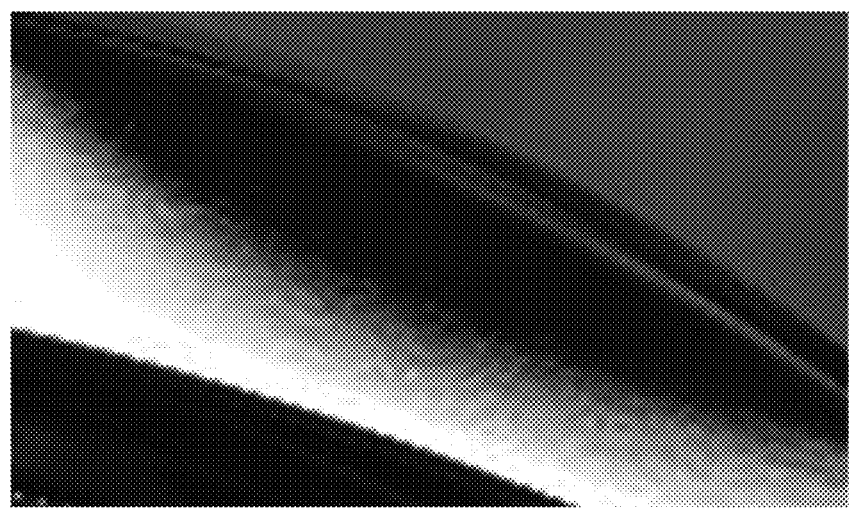
FIG. 6 is a photograph showing a surface of another case of an evaluation test.

FIG. 5 is a photograph of the case surface that is taken when the austenitic crystal grains have an average particle size of 150 μm and a maximum particle size of 400 μm. In addition, FIG. 6 is a photograph of the case surface that is taken when the austenitic crystal grains have an average particle size of 200 μm and a maximum particle size of 550 μm.

When the austenitic crystal grains have an average particle size of 150 μm and a maximum particle size of 400 μm as shown in FIG. 5, almost no influence of crystal grains is observed on the case surface, and the specularity is extremely high. On the other hand, when the austenitic crystal grains have an average particle size of 200 μm and a maximum particle size of 550 μm as shown in FIG. 6, the influence of crystal grains is slightly observed on the case surface, and the specularity is slightly low.

This suggests that, to ensure a predetermined design quality, the austenitic crystal grains of the austenized phase constituting the second layer desirably have an average particle size of 150 μm or smaller and a maximum particle size of 400 μm or smaller.

Note that when the austenitic crystal grains are set to have an average particle size of 1 μm and a maximum particle size of 2 μm, the number of times of heating in the nitrogen absorption treatment is increased. Therefore, in consideration of the production process, it is desirable that the austenitic crystal grains have an average particle size of 50 μm or greater and a maximum particle size of 100 μm or greater.

TABLE 1

| AVERAGE PARTICLE SIZE [μm] | MAXIMUM PARTICLE SIZE [μm] | DESIGN QUALITY DETERMINATION [—] |
|---|---|---|
| 1 | 2 | A |
| 50 | 100 | A |
| 100 | 250 | A |
| 150 | 400 | A |
| 200 | 550 | B |
| 250 | 650 | C |

Modification Example

Note that the present disclosure is not limited to each of the embodiments described above, and variations, modifications, and the like within the scope in which the object of the present disclosure can be achieved are included in the present disclosure.

In the embodiment described above, the watch component of the present disclosure is configured as the case 2, but the present disclosure is not limited thereto. For example, the watch component of the present disclosure may be configured as a bezel, a case back, a band, a crown, a button, or the like.

In the embodiment, the austenized ferritic stainless steel of the present disclosure constitutes a case as a watch component, but the present disclosure is not limited thereto. For example, the austenized ferritic stainless steel of the present disclosure may constitute a case of an electronic device other than a watch, i.e., a component of an electronic device such as a housing. With a housing composed the above-described austenized ferritic stainless steel, the electronic device can ensure a high magnetic resistance and can achieve a high design quality.

Summary of Present Disclosure

A watch component of the present disclosure includes an austenized ferritic stainless steel, the austenized ferritic stainless steel including a first layer including a ferrite phase, and a second layer including an austenized phase formed of a nitrogen solid solution of the ferrite phase. An average particle size of ferrite crystal grains constituting the ferrite phase is 300 μm or greater, and an average particle size of austenitic crystal grains constituting the austenized phase is 150 μm or smaller.

With this configuration, a predetermined magnetic resistance can be ensured, and a high design quality can be achieved.

In the watch component of the present disclosure, a maximum particle size of the austenitic crystal grains may be 400 μm or smaller.

With this configuration, it is possible to suppress the observation of crystal grains on the surface of the watch component, and the specularity can be increased.

In the watch component of the present disclosure, the first layer may contain 18 to 22 mass % of Cr, 1.3 to 2.8 mass % of Mo, 0.05 to 0.50 mass % of Nb, 0.1 to 0.8 mass % of Cu, less than 0.5 mass % of Ni, less than 0.8 mass % of Mn, less than 0.5 mass % of Si, less than 0.10 mass % of P, less than 0.05 mass % of S, less than 0.05 mass % of N, and less than 0.05 mass % of C, with the remainder composed of Fe and an unavoidable impurity.

In the watch component of the present disclosure, a nitrogen content of the second layer may be 1.0 to 1.6 mass %.

In the watch component of the present disclosure, a maximum particle size of the austenitic crystal grains may be 100 μm or greater.

A watch of the present disclosure includes the above-described watch component.

What is claimed is:

1. An austenized ferritic stainless steel, comprising:
   a first layer including a ferrite phase; and
   a second layer provided on a surface of the first layer and including an austenized phase formed of a nitrogen solid solution of the ferrite phase, wherein
   an average particle size of ferrite crystal grains constituting the ferrite phase is 300 μm or greater,
   an average particle size of austenitic crystal grains constituting the austenized phase is 150 μm or smaller,
   the first layer contains 18 to 22 mass % of Cr, 1.3 to 2.8 mass % of Mo, 0.05 to 0.50 mass % of Nb, 0.1 to 0.8 mass % of Cu, less than 0.5 mass % of Ni, less than 0.8 mass % of Mn, less than 0.5 mass % of Si, less than 0.10 mass % of P, less than 0.05 mass % of S, less than 0.05 mass % of N, and less than 0.05 mass % of C, with a remainder composed of Fe and an unavoidable impurity, and
   a magnetic resistance of the austenized ferritic stainless steel is 120 G or greater.

2. The austenized ferritic stainless steel according to claim 1, wherein a maximum particle size of the austenitic crystal grains is 400 μm or smaller.

3. The austenized ferritic stainless steel according to claim 1, wherein a nitrogen content of the second layer is 1.0 to 1.6 mass %.

4. The austenized ferritic stainless steel according to claim 2, wherein a nitrogen content of the second layer is 1.0 to 1.6 mass %.

5. The austenized ferritic stainless steel according to claim 1, wherein a maximum particle size of the austenitic crystal grains is 100 μm or greater and 400 μm or smaller.

6. The austenized ferritic stainless steel according to claim 3, wherein a maximum particle size of the austenitic crystal grains is 100 μm or greater and 400 μm or smaller.

7. A watch component comprising an austenized ferritic stainless steel, the austenized ferritic stainless steel including:
   a first layer including a ferrite phase; and
   a second layer provided on a surface of the first layer and including an austenized phase formed of a nitrogen solid solution of the ferrite phase, wherein
   an average particle size of ferrite crystal grains constituting the ferrite phase is 300 μm or greater,
   an average particle size of austenitic crystal grains constituting the austenized phase is 150 μm or smaller,
   the first layer contains 18 to 22 mass % of Cr, 1.3 to 2.8 mass % of Mo, 0.05 to 0.50 mass % of Nb, 0.1 to 0.8 mass % of Cu, less than 0.5 mass % of Ni, less than 0.8 mass % of Mn, less than 0.5 mass % of Si, less than 0.10 mass % of P, less than 0.05 mass % of S, less than 0.05 mass % of N, and less than 0.05 mass % of C, with a remainder composed of Fe and an unavoidable impurity, and
   a magnetic resistance of the austenized ferritic stainless steel is 120 G or greater.

8. The watch component according to claim 7, wherein a maximum particle size of the austenitic crystal grains is 400 μm or smaller.

9. The watch component according to claim 7, wherein a nitrogen content of the second layer is 1.0 to 1.6 mass %.

10. The watch component according to claim 7, wherein a maximum particle size of the austenitic crystal grains is 100 μm or greater and 400 μm or smaller.

11. The austenized ferritic stainless steel according to claim 3, wherein the nitrogen content of the second layer is 1.6 mass %.

12. The austenized ferritic stainless steel according to claim 1, wherein the first layer contains 0.5 mass % of Nb.

13. The watch component according to claim 9, wherein the nitrogen content of the second layer is 1.6 mass %.

14. The watch component according to claim 7, wherein the first layer contains 0.5 mass % of Nb.

* * * * *